United States Patent [19]

Rich et al.

[11] 4,012,301

[45] Mar. 15, 1977

[54] METHOD AND APPARATUS FOR THE INITIATION OF CHEMICAL REACTIONS

[75] Inventors: Joseph W. Rich, East Aurora; John W. Raymonda, Williamsville, both of N.Y.

[73] Assignee: Calspan Corporation, Buffalo, N.Y.

[22] Filed: July 28, 1975

[21] Appl. No.: 599,512

[52] U.S. Cl. .................. 204/157.1 R; 204/158 R; 204/162 R; 204/DIG. 11; 250/527

[51] Int. Cl.² ...................... B01J 1/10; B01K 1/00

[58] Field of Search ............ 204/DIG. 11, 157.1 R, 204/158 R, 162 R; 250/527

[56] References Cited

OTHER PUBLICATIONS

Mayer et al., Applied Optics, vol. 17, No. 12 (Dec. 15, 1970) pp. 516-519.
Ambartzumian et al., Applied Optics, vol. 11, No. 2 (Feb. 1972) pp. 354-358.
Karlov, Applied Optics, vol. 13, No. 2 (Feb. 1974), pp. 301-309.

*Primary Examiner*—Howars S. Williams
*Attorney, Agent, or Firm*—David J. Zobkiw

[57] ABSTRACT

Laser radiation is employed to initiate and promote chemical reactions by creating states of molecular vibrational mode excitation exceeding those appropriate to the translational temperature of the medium in one or more of the reactants. In favorable cases, vibrational excitation in a certain vibrational normal mode of a reactant will act to accelerate the rate of a desired chemical reaction. The reactants can be pressurized so that their vibration-rotation spectrum can be broadened to the point that laser radiation can be absorbed without the need for exact coincidence between a line or lines of the spectrum of the reactant and that of available lasers. Provision can be made for isolation and analysis of products, recycling of unused reactants, temperature control of reactants and real-time monitoring of the state of vibrational excitation of the reactants.

16 Claims, 5 Drawing Figures

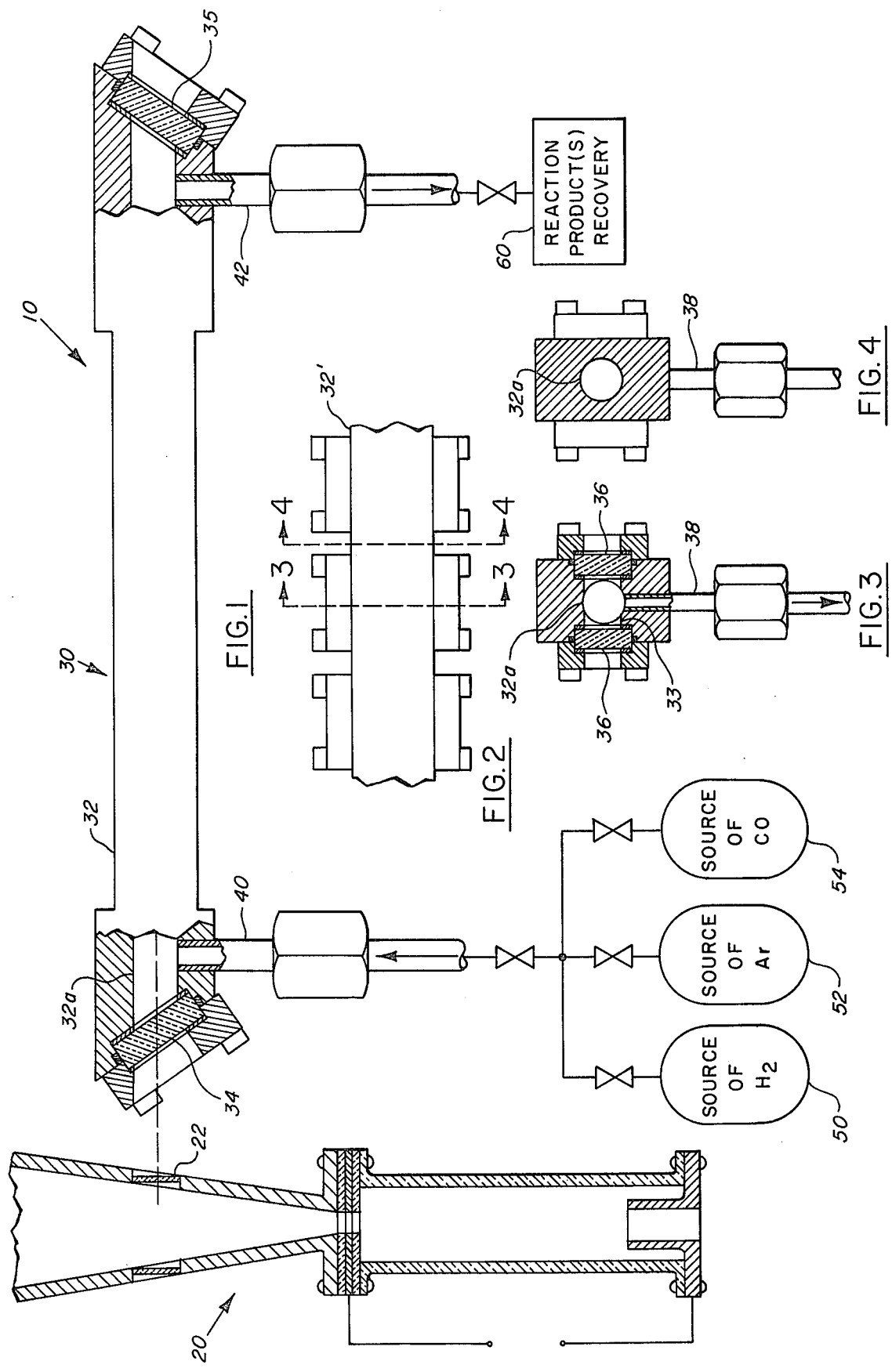

METHOD AND APPARATUS FOR THE INITIATION OF CHEMICAL REACTIONS

In many chemical processes of industrial importance a catalyst is used. The purpose of the catalyst is to enhance the economic return from the process by accelerating the rate of occurrence of a desired reaction or reactions to a sufficient extent that a useable yield is obtained at economically reasonable conditions of temperature, pressure and reactant flow rates. As is well-known, rates of chemical reactions can generally be increased by employing conditions of high temperature, pressure and reagent concentrations. However, these means of increasing rates of reactions, when used alone, can be impractical in industrial processes for any of several reasons.

First, increasing temperature is non-specific; it increases the rates of all possible chemical reactions available to a reactant system. Among such reactions can often be the thermal decomposition of the reactants and/or the desired product(s). Even where this is not the case, separation and purification of products can be difficult and expensive if a large number of products are formed, each in relatively minor amounts. A useful catalyst has the property of accelerating, at worst, only a few of the possible reactions toward the equilibrium state which is determined by the temperature, pressure and reactant concentrations. It should be noted that the catalyst does not influence the actual equilibrium concentrations of reactants and products; these are determined solely by temperature, pressure, and relative concentrations of the reactants; the catalyst merely accelerates the approach of the system to the equilibrium state so determined.

Second, the temperature required for a certain reaction to proceed at a useful rate may be inimical to the formation of useable amounts of products because the equilibrium state determined by the temperature may grossly favor the reactants rather than the products. An example is the formation of ammonia ($NH_3$) from hydrogen and nitrogen. The reaction is $$N_2 + 3H_2 \rightleftarrows 2NH_3$$

It proceeds with vanishing rate at low temperatures (<1200° C) in the absence of a catalyst. However, at higher temperatures, where the rate might become reasonable, the equilibrium lies toward the left to the extent that observable amounts of ammonia cannot be obtained. In the Haber process for ammonia synthesis a catalyst allows the reaction to proceed at a useful rate at a temperature of about 550° C and at a pressure of 200–250 atmospheres with a 15–20%, by weight, conversion on each pass of reactants through the reactor.

Third, the greater difficulties, and therefore expense, in constructing reaction vessels and transport systems to operate at extreme conditions militate against the indiscriminate use of high temperature and pressure to promote reactions.

Fourth, simple heating to accelerate reactions is wasteful of energy since only the energy going into the so-called "active-mode," i.e., that which advances the system along the reaction coordinate, is effective in increasing the desired reaction rate.

The uses of catalysts in modern chemical synthesis on an industrial scale can best be understood in terms of processes of economic importance with reference to the benefits and problems associated with the use of catalysts.

First, the synthesis of ammonia is achieved through more than 10 different industrial processes, the first of which was the Haber-Bosch process. All of the presently employed industrial processes for the production of ammonia use some sort of solid catalyst bed and operate at about 500° C, but the operating pressures vary over a rather wide range, from 3,000 to 15,000 psig. Laboratory studies have shown that the function of the catalyst is to promote the dissociation of the nitrogen. Hence, many hydrogenation catalysts, which function by promoting hydrogen dissociation, are completely ineffective in ammonia synthesis. The only catalysts of economic importance in ammonia synthesis are iron oxides of a composition approximating $Fe_3O_4$ which have either been reduced to metal in situ or "prereduced" and "promoted" with various nonreducible oxides such as $Al_2O_3$, $K_2O$ and $CaO$.

A large amount of effort has been expended over the years in seeking to manufacture catalysts that are not easily poisoned by minor amounts of impurities in the synthesis gas. While this problem has been alleviated considerably, extensive purification is still needed in order to prolong catalyst life. The main impurities to be removed are water, carbon monoxide and carbon dioxide which are present in the hydrogen as a consequence of obtaining the hydrogen from natural gas or petroleum. Some sulfur compounds are usually present as well. The necessity to purify feedstocks in order to avoid poisoning catalysts is a recurrent problem in industrial chemistry. The catalysts themselves are often expensive to buy and expensive to recondition, once poisoned. It should be noted that the impurity levels of many catalyst poisons must be kept to 1 ppm, or less, to avoid immediate destruction of the catalyst's activity. These catalyst poisons include sulfur compounds, chlorine and its compounds (<0.1 ppm allowable), and compounds of phosphorus, arsenic and many metals.

Another problem associated with the use of these catalysts results from the need for achieving high surface contact of reactant gases with the catalyst bed. This leads to a reactor design with a multitude of small gas passages which are susceptible to clogging by solid materials, either those entrained in the entering synthesis gas or those formed in reactions between the above-mentioned impurities and the catalyst bed materials, especially the promoters.

Second, the hydrogenation of carbon monoxide to form methanol, methane and higher hydrocarbons takes place in a number of processes of which the Fischer-Tropsch process for hydrocarbons is typical. In general, the basic reactions are:

$$(2n + 1) H_2 + n\, CO \rightarrow C_nH_{2n-2} + nH_2O$$

$$2nH_2 + n\, CO \rightarrow C_nH_{2n} + nH_2O$$

$$2nH_2 + n\, CO \rightarrow C_nH_{2n-1}OH + (n - 1) H_2O$$

The reactions form paraffins, olefins and alcohols, respectively. A wide variety of catalysts and reaction conditions are used depending upon the products desired. The catalysts are composed of various metals such as nickel, iron, cobalt and ruthenium along with various metal oxide promoters. Pressures can range from 1 to 500 atmospheres and the temperature from 170° to 475° C.

The mechanism by which the carbon monoxide is hydrogenated in these surface catalyzed reactions is not well known, but the best model proposed to date involves initiation by bonding of the carbon of a carbon monoxide molecule to a surface metal atom followed by the addition of hydrogen to form an intermediate surface-stabilized HCOH radical:

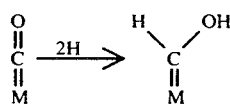

Higher hydrocarbons are preceded by the sequential addition of several of these radicals, e.g.,

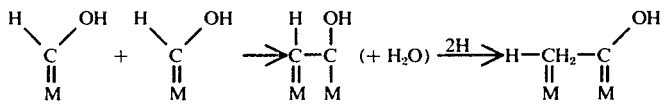

The principal problems connected with the use of the catalysts in these processes include fouling by liquid products, deposition of carbon and poisoning by excess carbon monoxide.

It is an object of this invention to provide a method and apparatus for initiating vapor phase chemical reactions without the use of surface active catalysts.

It is an additional object of this invention to provide a method and apparatus for selectively exciting the reaction energy mode to initiate gas phase chemical reactions.

It is a further object of this invention to provide a method and apparatus for selectively exciting the vibrational modes of reacting molecules to very high energies.

It is a still further object of this invention to provide a method and apparatus for accelerating the rate of gas phase reactions while maintaining the translational and rotational modes relatively cold. These objects, and others as will become apparent hereinafter, are accomplished by the present invention.

The present invention provides an alternative way to carry out the above-described processes, as well as many others, completely in the vapor phase, without the need for surface active catalysts. Some of the advantages of such an approach include: (1) scalability due to the completely volumetric nature of the process; and (2) the feed stocks do not, in general, require extensive purification because there is no surface to be poisoned by minor impurities. Additional, less obvious, advantages, which will become clearer in view of the detailed discussion to follow, are: (1) the possibility for extremely specific direction of reaction along a desired pathway to a single product; and (2) the translational temperature can be kept quite low, reducing the number of thermally induced side reactions.

Briefly, the present invention uses a laser emitting a suitable wavelength(s) of light to excite a vibrational degree of freedom of a reactant molecule to a state of excitation much higher than is appropriate to the translational temperature of the reactant mixture. A continuous wave (cw) laser is used in conjunction with a continuous flow of reactant gases in a flow reactor to achieve this condition of high molecular vibrational excitations and low translational temperature. The use of a cw laser, rather than a pulsed laser, improves the rate of vibrational excitation of the reactants. In favorable cases, such vibrationally excited molecules will be orders of magnitude more reactive than an unexcited molecule, and they will enter into a rapid and specific reaction with another reactant to form a desired product. This can arise from specific features of the potential hypersurface describing the energy of interaction in a collision between the reactant molecules.

Although the invention is described as using an electrically excited supersonic CO laser as a radiation source, any laser can be used, and, in fact, the laser of choice depends upon the reaction to be promoted. Specifically, the laser must emit radiation that is absorbed by a vibrational mode of a reactant molecule. This generally implies a laser emitting infrared photons (from about 3 microns to 50 microns in wavelength) but does not exclude a laser emitting photons of shorter wavelength since such photons could, in selected cases, be absorbed on overtone bands of reactant vibrational modes.

It is better if a close match between the wavelength of a laser-emitted photon and the wavelength of an absorption of a reactant molecule can be found. Then, absorption of laser energy can proceed efficiently, at least on that absorption. Since most lasers emit radiation on many lines simultaneously, it is still better if close matches with absorption features in the reactants can be found for several or all of the emitted lines. Finding a single match is rare enough and finding many matches is, of course, more so. To get around this difficulty, a sufficiently high pressure of gas, either inert diluent or one of the reactants, is supplied such that the vibration-rotation spectrum of the reactant to be excited is broadened to the extent that the transmitting gaps between absorption features are "filled in" and a continuum of absorbance is presented to the laser beam. In this way the power spectrum of the laser is absorbed more or less strongly over a wide range of lines and efficient excitation of the reactant occurs.

It is desirable to excite the chosen reactant mode as highly as possible, i.e., to as high a vibrational quantum state as possible. The present invention provides for this in two ways. First, the residence time of the reactants in the light beam is long enough that molecules singly excited, i.e., in the $v = 1$ state, have the opportunity to absorb a quantum of the correct wavelength to induce a transition to the second excited state, if such a photon is available in the beam. It should be noted that the wavelength required for the transition $v = 0 \rightarrow v = 1$, and $v = 1 \rightarrow v = 2$, and so on for all $v \rightarrow v + 1$ transitions, are different owing to the anharmonic nature of molecular vibrations. In fact, a single molecule can absorb several photons depending upon the product of the residence time and the laser beam power density. Second, it has been shown by Treanor, Rich and Rehm (Reference 1) that vibrationally excited molecules can transfer excitation between each other in a fashion that leads to ever higher states of vibrational excitation for some of them, i.e., the so-called V—V exchange mechanism. This process is facilitated by having a low translational temperature in the gas. To achieve this condition, a heat exchanger is provided at the inlet port to the reaction vessel and, in a flow process, the incoming gases can be cooled to any desired temperature, depending on the physical properties of the gases. For instance, condensation of the reactants should be avoided. In practice, cooling a mixture of argon and carbon monoxide to 200° K, for example, has greatly enhanced the vibrational excitation achieved in carbon monoxide.

Of course, this beneficial effect of having a low translational temperature harmonizes well with the desire to minimize the random thermal promotion of undesired reactions. In a static process, low translational temperatures can be maintained by cooling the reaction vessel directly.

In one form of the present invention, a high-pressure cell has a mixture of carbon monoxide, hydrogen and an inert gas diluent flowing therein. The cell contains infrared-transparent windows which admit a laser beam from a high power, short wavelength, electrically excited, supersonic flow CO laser to create a non-equilibrium condition in the mixture. Reference should be had to copending, commonly assigned application Ser. No. 550,101 filed Feb. 14, 1975 and the references cited therein for a discussion of optically vibrational-vibrational pumping a cell.

BRIEF DESCRIPTION OF THE DRAWINGS

For a fuller understanding of the present invention, reference should now be had to the following detailed description thereof taken in conjunction with the accompanying drawings wherein:

FIG. 1 is a partially sectioned view of the apparatus of the invention;

FIG. 2 is a partial view of a modified reactor tube;

FIG. 3 is a sectional view taken along line 3—3 of FIG. 2;

FIG. 4 is a sectional view taken along line 4—4 of FIG. 2; and

In FIG. 1, the numeral 10 generally designates a gas phase reaction system which includes a CO pumping laser which is generally designated 20 and a reaction cell which is generally designated 30. As illustrated, CO pumping laser 20 represents the supersonic flow CO laser which is the subject matter of U.S. Pat. No. 3,811,095. Reaction cell 30 is basically a high-pressure infrared absorption cell designed to accommodate a fast gas flow along its axis and includes reactor tube 32 which is equipped with CaF$_2$ windows 34 and 35, respectively, at the ends of reactor tube 32 and in optical alignment with mirror 22 of laser 20. Gas from gas supply sources 50, 52 and 54 is supplied as a mixture to reactor tube 32 via inlet defining line 40. Reactor tube 32 is connected to a reaction product recovery structure 60 via outlet defining line 42.

Figure 5:
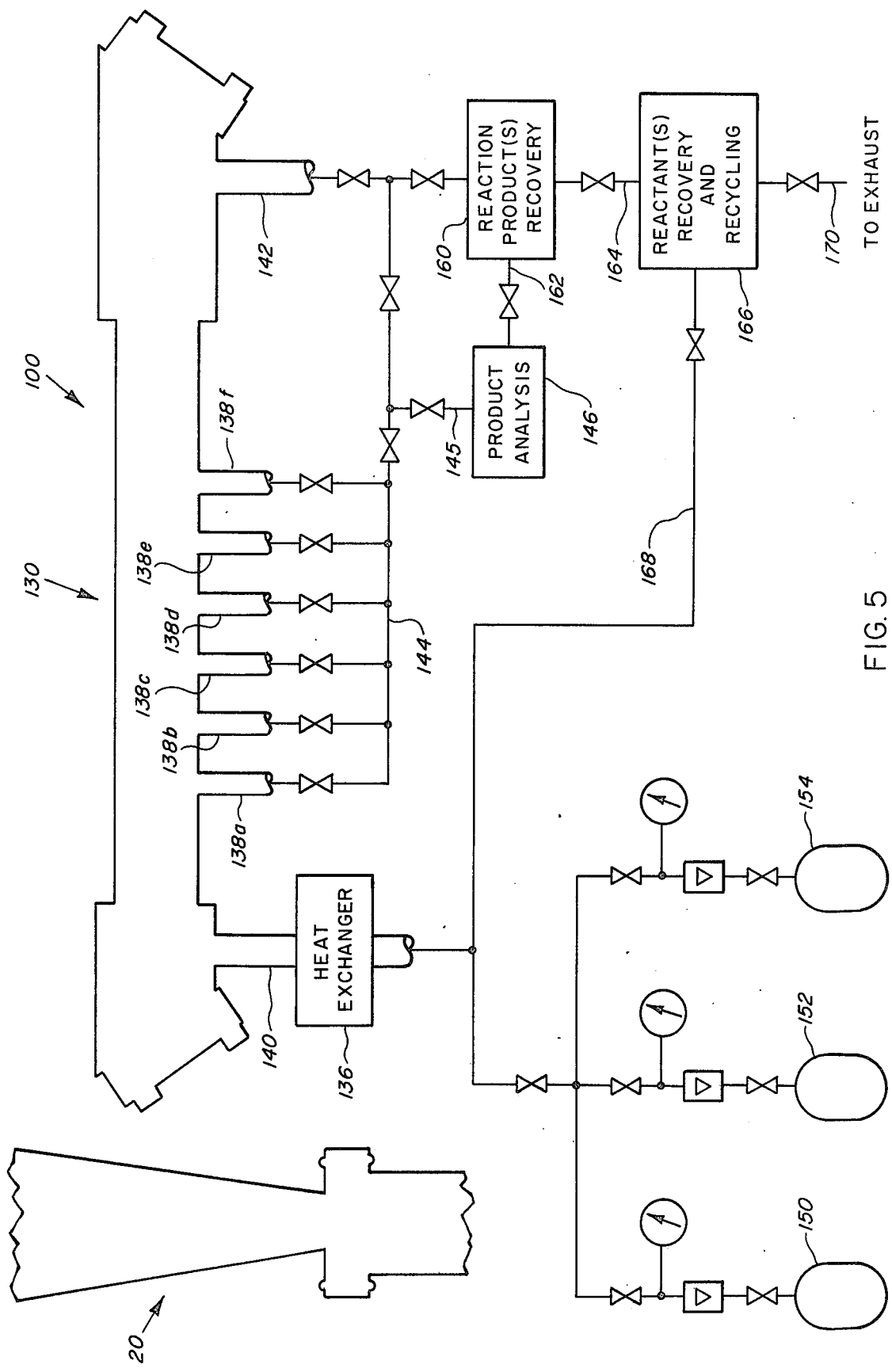
FIg. 5 is a schematic view of a modified system.

A modified reactor tube 32' is illustrated in FIGS. 2–4. Reactor tube 32' differs from reactor tube 32 in that it is equipped with infrared-transmitting windows 36 along its length to permit spectroscopic monitoring of the degree of reactant vibrational excitation and rotational temperature as well as for monitoring product formation. Sampling port defining lines 38 are located along the length of reactor tube 32' for withdrawing reaction products from reactor tube 32' for analysis.

In FIG. 5, the numeral 100 generally designates a modified gas phase reaction system which includes CO pumping laser 20, which is illustrated in detail in FIG. 1, and a reaction cell generally designated 130. Reaction cell 130, like reaction cell 30 of FIG. 1, is a high-pressure absorption cell designated to accommodate a fast gas flow along its axis and includes a reactor tube equipped with CaF$_2$ windows at its ends and in optical alignment with the mirror 22 of laser 20. Gas from gas supply sources 150, 152 and 154 is supplied as a mixture to reaction cell 130 via inlet defining line 140. The mixture ratio, pressure, flow rate and temperature of the mixture of gases supplied are controlled through the use of suitable conventional valves, pressure regulators, flowmeters, etc., and by the use of heat exchanger 136. Reaction cell 130 is provided with a plurality of valved sampling lines 138a–f, similar to the lines 38 of FIGS. 3 and 4, which are connected via valved lines 144 and 145 to product analysis structure 146. Reaction cell 130 is connected to either reaction product recovery structure 160 via valved outlet line 142 or to product analysis structure 146 via valved lines 142, 144 and 145. Reaction product recovery structure 160 is connected to product analysis structure 146 via valved line 162 and to reactant recovery and recycling structure 166 via valved line 164. Reactant recovery and recycling structure 166 is connected to inlet line 140 via valved line 168 and to exhaust or waste via line 170.

OPERATION

The operation of the system of FIG. 1 will be described with particular reference to the gas phase hydrogenation of carbon monoxide.

A mixture of carbon monoxide and hydrogen in a preponderance of argon diluent is supplied from sources thereof, 50, 52 and 54, respectively, at room temperature and a pressure in the general range of 20 to 100 atmospheres. The mixture is supplied via line 40 to the end of reactor tube 32 which is closest to laser 20 and, together with any reaction products, is withdrawn from reactor tube 32 via line 42 which delivers the mixture, including the reaction products, to suitable reaction products recovery structure 60. Laser radiation passes from supersonic flow CO pumping laser 20 via mirror 22 and is admitted into the high-pressure reactor tube 32 via CaF$_2$ window 34. The laser radiation from laser 20 is parallel to the axis of reactor tube 32 and fills the tube diameter to produce selective excitation of the vibrational energy states of the reactant molecules. A non-equilibrium mixture of carbon monoxide and hydrogen is created in reactor tube 32. The vibrational energy modes of these gases are quite excited (vibrational energies typically $E_{vib}/k = 2500°$ K), while the translational and rotational modes of the gases are quite cool ($T_{trans}=T_{rot}=200°–400°$ K). These non-equilibrium conditions are created by allowing the laser radiation from laser 20 to excite the vibrational mode of CO, and by the use of a rapid flow velocity to produce convective cooling. The rather low design-translational temperature of the reaction cell 30, 200°–400° K, is selected to enhance vibrational-vibrational (V—V) pumping of the reactant species as well as permitting the unambiguous analysis of the laser initiated reaction. If the translational temperature of the reaction species is permitted to rise to levels which would allow purely thermal activation of the chemical reactions ("Bunsen burner effect"), the extent of rate enhancement due to laser excitation of the vibrational mode would be reduced and the above-noted disadvantages would be introduced. It should be emphasized that selective excitation of the reaction modes is preserved by means of a fast gas flow and slow relaxing gas mixture, obviating the need for rapid pulsed operation of the system. Previous steady-state reactions (References 2 and 3) which are typical of the prior art have required low pressures to maintain selective excitation; that is not the case here. A principal advantage of cw laser excitation over a pulsed approach is that the absorption of laser energy by the reactant molecule is much more efficient. In a pulsed laser, only a small fraction of the total number of available rotational energy states can absorb laser energy during the time of the pulse. This "bleaching phenomenon" is discussed in a recent paper (Reference 4). In addition to this feature, the present method offers all the diagnostic advantages of a steady-state process.

The design conditions for the reaction cell 30 include a large preponderance of argon diluent. This diluent serves two functions:

i. The argon pressure-broadens the CO absorption lines, thereby maximizing the fraction of laser energy absorbed by the CO vibrational mode without increasing the number of absorbers; and ii. The argon provides a high degree of convective cooling of the reaction species.

The argon, however, can be replaced by additional carbon monoxide, since a greater temperature rise in the gas can be tolerated, and higher power CO lasers can be used.

For a stated amount of laser power absorbed into the vibrational mode of the gases in the reactor cell 30, the rise in temperature of translational and rotational modes can be calculated. This is estimated by equating the rate of convectional cooling of the gases to the rate of relaxation of the vibrational energy into translation and rotation. This relaxation of vibrational energy occurs by collisions, and is assumed to be governed by a Landau-Teller type relaxation expression. The overall equation is $$\frac{5}{2} N_{TOT} \int_{T_{IS}}^{T_{OUT}} u dT = N_{CO} \int_0^L \left[ \frac{\epsilon}{k} - \left( \frac{C_{VIB}}{k} \right) T \right] \tau_{MIX}^{-1} dl$$

Here, $N_{TOT}$ = total gas number density (molecules/cm$^3$)
$T_{IS}$ = gas temperature at entrance to cell (°K)
$T_{OUT}$ = gas temperature at exit from cell (°K)
$U$ = gas velocity (cm/sec)
$N_{CO}$ = CO number density (molecules/cm$^3$)
$L$ = cell length (cm)
$\epsilon$ = vibrational energy per CO molecule (ergs/molecule)
$k$ = Boltzmann constant = 1.38033 × 10$^{-16}$ (ergs/molecule deg)
$C_{VIB}/k$ = non-dimensional contribution of vibrational energy to specific heat of the gases $T$ = gas translational and rotational temperature (°K)
$\tau_{MIX}$ = vibrational relation time of CO in gas mixture (sec)

$$= \frac{X_{CO}}{\tau_{CO-CO}} + \frac{X_{H_2}}{\tau_{CO-H_2}} + \frac{X_{Ar}}{\tau_{CO-Ar}}$$

where $X_i$ is the mole fraction of species $i$, $\tau_{CO-i}$ is the vibrational relaxation time for CO infinitely dilute in species $i$. Note these times are inversely proportional to the partial pressure of the diluent.

The degree of absorption of the laser radiation by the reactive species is determined by measuring both the incident laser power and the laser power transmitted through window 35. Measuring the absorption of laser power and the first overtone infrared radiation from the excited CO vibrational state indicates that at a total reactor tube pressure of 27 atmospheres and a CO partial pressure of 0.3 atmospheres, the CO vibrational temperature is above 2000° K while a translational temperature of approximately 200° K is being maintained.

The laser-initiated gas phase hydrogenation of carbon monoxide takes place in a series of consecutive hydrogenation steps. The hydrogenation steps yield formaldehyde, methanol and saturated hydrocarbons of the general formula $C_nH_{2n+2}$ which are more favorable under the highly nonequilibrium conditions achieved in reaction cell 30, than under total equilibrium temperature conditions. The hydrogenation takes place in the following series of steps:

$H_2 + CO \rightarrow H_2CO$ $H_2 + H_2CO \rightarrow H_3COH$ $H_2 + H_3COH \rightarrow CH_4 + H_2O$ Further hydrogenation takes place according to the formula $nCO + (2n + 1) H_2 \rightarrow C_nH_{2n+2} + nH_2O$ The hydrogenation products obtained and their relative amounts depend upon a number of factors which include: (1) the amount and relative percentages of the gases supplied to the reactor cell; (2) the time of exposure to the laser radiation; (3) the total pressure of gases in the reactor cell; (4) the amount of laser radiation supplied to the reactor cell; and (5) the temperature in the reactor cell.

The system of FIG. 1 can be modified as shown in FIGS. 2–4 to permit monitoring and analysis of the reactions. As is best shown in FIG. 3, the axial bore 32a, which together with windows 34 and 35 defines the reaction chamber of reaction cell 30, is periodically intersected by transverse bores 33 having windows 36 located at the ends thereof in a sealed relationship to permit the spectroscopic monitoring of the reaction at different locations along the reactor tube 32'. In addition, sampling port defining lines 38 are similarly located along the length of reactor tube 32' to permit the withdrawal and analysis of gas samples.

The operation of the system 100 of FIG. 5 is similar to that of system 10 of FIG. 1. Reactant, diluent and/or transfer gases are supplied from a plurality of sources, of which three, 150, 152 and 154, have been illustrated, to inlet defining line 140 of reaction cell 130. The specific gases and their relative amounts will be determined by the desired reaction product(s) and by the mechanism necessary to achieve selective exciting of vibrational modes of at least one reactant species. In some reactions it is necessary and/or desirable to use a transfer gas which absorbs the radiation energy emitted by pumping laser 20 and transfers this energy by inelastic molecular collisions to the reactant species. The rates of flow, pressures and ratios of the gases supplied by sources 150, 152 and 154 are controlled through the use of conventional means such as valves, pressure regulators and flow meters. Heat exchanger 136 is located in line 140 at the inlet of reaction cell 130 to regulate the temperature of the mixture of gases supplied to reaction cell 130. At least one reactant species in the mixture of gases flowing through reaction cell 130 is selectively vibrationally excited by the radiation energy emitted by pumping laser 20 as described above in regard to system 10 of FIG. 1. The reaction product(s) together with any unreacted gases, diluent and transfer gas are withdrawn from reaction cell 130 via line 142 and are delivered to the reaction product recovery structure 160 which includes structure for removing and storing the reaction product(s) supplied via line 142. The residual gases made up of the unreacted gases, diluent, transfer gas and unrecovered reaction products such as water pass via line 164 from reaction product recovery structure 160 to reactant recovery and recycling structure which includes structure for removing and purifying the unreacted gases, diluent and transfer gas. Water and other undesired products, reactants, diluent or transfer gases are exhausted via line 170. Recovered reactants, diluent, transfer gas as well as intermediate reaction products can be recycled for further processing and are supplied via line 168 from reactant recovery and recycling structure 166 to line 140. It may be necessary to provide a pump or other conventional structure in line 168 to repressurize the recycled gases and it may be necessary or desirable to regulate the gases supplied from sources 150, 152 and 154 in response to the amount and composition of the recycled gases supplied via line 168 and such systems are conventional in the fluid handling art.

Analysis of the products and rate of reaction is accomplished by product analysis structure 146. Product analysis structure 146 consists of conventional chemical and/or physical analysis devices and is connected via lines 138a–f and line 145 for the analysis of the rates of reaction and for determining the reaction products at various points in the system. Product analysis structure 146 is also alternately connectable to either line 142 to analyze the total reaction and its products or to reaction product recovery structure 160 for the analysis of the recovered reaction product(s). If desired, the product analysis structure may be connected to reaction product recovery structure 160 to permit recovery and recycling of the reaction product(s), reactants, diluent and/or transfer gases.

There are other reactions to which the concept of laser catalysis is applicable. The most obvious of these is the synthesis of ammonia, $NH_3$, from $H_2$ and $N_2$. As outlined earlier, this synthesis is carried out industrially by several processes, including the Haber process, all of which involve subjecting a mixture of $H_2$ and $N_2$ to high pressures over a catalyst at about 400° to 650° C. The catalysts are all easily poisoned and therefore extensive purification of the process gases is required. It has been found that the key role of the catalyst is to promote the cleavage of the $N_2$ bond. This reaction can be promoted in the vapor phase by inducing vibrational excitation of the $N_2$ with a laser. The $N_2$ can be excited directly by a CO laser in double molecule transitions at very high pressures or by energy transfer using a trace amount of CO as the primary absorber of the CO laser radiation. Once excited, the $N_2$ will self-pump by the V—V exchange mechanism and will become reactive. The vibrational-translational (V-T) relaxation of $N_2$ is extremely slow and radiative decay will also be negligible because $N_2$ is non-polar. The reaction can be carried on at low translational temperature favoring the exothermic formation of ammonia.

The CO laser has the bulk of its output in the wavelength range in which the water molecule, $H_2O$, absorbs in the bending mode. Thus, absorption of CO laser radiation will tend to straighten the normally bent $H_2O$ molecule and place it in a more reactive state. This could have application in such reactions as the steam reforming of hydrocarbons, in which hydrocarbons are allowed to react with steam in the presence of a catalyst resulting in desired alterations of structure and molecular weight distributions.

Although preferred embodiments of the present invention have been illustrated and described, other changes will occur to those skilled in the art. For example, the argon diluent can be eliminated, the hydrogenation products may be recycled in the reactor cell or may serially pass through a plurality of reactor cells to carry the hydrogenation process to the desired point. The number of gas sources can be varied to meet the requirements of the reactions desired. The flows in the various lines can be controlled and correlated as is conventional in the fluid handling and chemical processing arts. Other laser sources may be used and the laser cell windows will be mounted at the proper Brewster's angle for the wavelength of the laser radiation and the material of the windows to minimize laser radiation losses due to reflections off the windows. It is therefore intended that the scope of the present invention is to be limited only by the scope of the appended claims.

REFERENCES

1. Treanor, C. E., J. W. Rich and R. G. Rehm, "Vibrational Relaxation of Anharmonic Oscillators with Exchange-Dominated Collisions," *Journal of Chemical Physics*, Volume 48, number 4 (Feb. 5, 1968) 1798–1807.

2. Yogev. A., R. M. J. Loewenstein and D. Amar, "Photochemistry in the Electronic Ground State. I. Vapor Phase Irradiation of Organic Compounds by Continuous Wave Carbon Dioxide Gas Laser," *Journal of the American Chemical Society*, Volume 94, number 4 (Feb. 23, 1972) 1091–1096.

3. Yogev, A., R. M. J. Loewenstein-Benmair, "Photochemistry in the Electronic Ground State. II. Selective Decomposition of trans-2-Butene by Pulsed Carbon Dioxide Laser," *Journal of the American Chemical Society*, Volume 95, number 25 (Dec. 12, 1973) 8487–8489.

4. Letokhov, V. A. and A. A. Makarov, "Kinetics of Excitation of Molecular Vibrations by Infrared Laser Radiation," *Soviet Physics JETP*, Volume 36, number 6 (June, 1973) 1091–1096.

We claim:

1. A method for initiating and accelerating vapor phase chemical reactions in a mixture of reactant species including the steps of:

supplying a plurality of reactant species to a reaction chamber;

continuously flowing the reactant species through the reaction chamber;

maintaining the reaction chamber at a pressure such that the vibration-rotation spectra of the reactant species are pressure-broadened to enhance the efficiency of absorption of laser radiation;

selectively exciting vibrational modes of at least one of the continuously flowing reactant species with a continuous wave laser which emits radiation that is absorbed by the vibrational mode of at least one reactant species to achieve a condition of high molecular vibrational excitations and low translational temperature to create a nonequilibrium mixture of the reactant species whereby the rate of vapor phase chemical reactions is accelerated while the translational and rotational modes of the mixture of reactant species is maintained relatively cold; and withdrawing the reaction products from the reaction chamber.

2. The method of claim 1 further including the step of supplying diluent at a pressure in the range of 20 to 100 atmospheres so that the vibration-rotation spectrum of the reactant species to be excited is pressure-broadened.

3. The method of claim 1 wherein hydrogen and nitrogen are the reactant species.

4. The method of claim 1 wherein carbon monoxide and hydrogen are the reactant species.

5. The method of claim 1 wherein a mixture of reactant species is supplied to a reaction chamber.

6. The method of claim 1 wherein the step of supplying a plurality of reactant species to a reaction chamber includes controlling the temperature of the reactant species supplied to the reaction chamber.

7. The method of claim 1 further including the steps of:

recovering the reaction product;

sampling withdrawn reaction products and reaction products at selected locations in the reaction chamber;

recovering reaction products; and recovering and recycling unreacted reaction species.

8. A method for initiating and accelerating vapor phase chemical reactions in a mixture of reactant species including the steps of:

supplying a plurality of reactant species to a reaction chamber;

continuously flowing the reactant species through the reaction chamber;

maintaining the reaction chamber at a pressure such that the vibration-rotation spectra of the reactant species are pressure-broadened to enhance the efficiency of absorption of laser radiation;

selectively exciting vibrational modes of at least one of the continuously flowing reactant species by using a transfer gas which absorbs radiation energy emitted by a continuous wave pumping laser and transfers the absorbed energy to the reactant species by inelastic molecular collisions to achieve a condition of high molecular vibrational excitations and low translational temperature to create a nonequilibrium mixture of the reactant species whereby the rate of vapor phase chemical reactions is accelerated while the translational and rotational modes of the mixture of reactant species is maintained relatively cold; and withdrawing the reaction products from the reaction chamber.

9. Apparatus for initiating and accelerating vapor phase chemical reactions in a mixture of reactant species including:

reaction vessel means defining a flow-through high-pressure cell having inlet means for supplying a plurality of reactant species, outlet means for withdrawing reaction products and a pair of optically aligned windows which are transparent to laser radiation; and means including a continuous wave, high power, short wavelength, electrically excited supersonic flow laser for selectively creating a state of vibrational excitation of at least one of the reactant species whereby the vibrational degree of freedom of said at least one reactant species is much higher than is appropriate to the translational temperature of the mixture of reactant species so that vapor phase chemical reactions are promoted.

10. The apparatus of claim 9 further including:

reactant species storage means and diluent storage means;

means connecting said reactant species storage means and said diluent storage means to said inlet means for supplying said reactant species and diluent to said reaction vessel means; and means for controlling the relative amounts and pressures of the reactant species and diluent supplied to said reaction vessel means.

11. The apparatus of claim 10 further including means for controlling the temperature of the reactant species and diluent supplied to said reaction vessel means.

12. The apparatus of claim 9 further including means for supplying inert diluent to said reaction vessel means at a pressure in the range of 20 to 100 atmospheres whereby the vibration-rotation spectrum of the mixture of reactant species is pressure broadened.

13. The apparatus of claim 9 wherein said reaction vessel means is provided with means for monitoring the chemical reactions in said reaction vessel means.

14. The apparatus of claim 9 wherein said reaction vessel means is provided with means for withdrawing samples from said reaction vessel means.

15. The apparatus of claim 9 further including:

reactant species storage means;

means connecting said reactant species storage means to said inlet means and including means controlling the relative amounts, pressures and temperatures of said reactant species supplied to said reaction vessel means.

16. The apparatus of claim 15 further including:

reaction product recovery means connected to said outlet means; and reactant recovery and recycling means connected to said reaction product recovery means and said means connecting said reactant species storage means to said inlet means.

* * * * *